(12) United States Patent
Lai et al.

(10) Patent No.: US 6,728,991 B2
(45) Date of Patent: May 4, 2004

(54) CASTER ASSEMBLY WITH SLIDING SIDE SUPPORT PIECE

(75) Inventors: Chi-Yeung Anthony Lai, Burlington, MA (US); John Henry Schaffeld, Lexington, MA (US)

(73) Assignee: Waxman Industries, Inc., Bedford Heights, OH (US)

( * ) Notice: Subject to any disclaimer, the term of this patent is extended or adjusted under 35 U.S.C. 154(b) by 0 days.

(21) Appl. No.: 10/122,578

(22) Filed: Apr. 15, 2002

(65) Prior Publication Data

US 2003/0192145 A1 Oct. 16, 2003

(51) Int. Cl.[7] ............................................. B60B 33/04
(52) U.S. Cl. ........................... 16/19; 16/42 R; 16/35 R
(58) Field of Search ..................... 16/19, 42 R, 42 T, 16/35 R

(56) References Cited

U.S. PATENT DOCUMENTS

| | | | |
|---|---|---|---|
| 568,535 A | | 9/1896 | Isidor |
| 835,492 A | | 11/1906 | Baker |
| 1,532,064 A | * | 3/1925 | Neiswender .................... 16/21 |
| 2,049,344 A | * | 7/1936 | Wittke, Jr. ...................... 16/30 |
| 2,175,317 A | | 10/1939 | Rogers |

(List continued on next page.)

*Primary Examiner*—Anthony Knight
*Assistant Examiner*—Michael J. Kyle
(74) *Attorney, Agent, or Firm*—Watts Hoffmann Co., L.P.A.

(57) ABSTRACT

The present invention is directed to a caster assembly for supporting an object. The assembly includes a caster wheel, a support member rotatably supporting the wheel and first and second side support pieces mounted on the support member. The support member includes a base support surface for engaging and supporting a bottom surface of an object. The first side support piece includes a first support surface adapted to engage and support a first side surface of the object. The second side support piece includes a second support surface adapted to engage and support a second side surface of the object. At least one of the side support pieces is slidably mounted on the support member and is adapted to be moved relative to the other side support piece to permit adjustment of a distance between the between the first and second side support surfaces to accommodate objects of different widths.

20 Claims, 8 Drawing Sheets

U.S. PATENT DOCUMENTS

| | | | |
|---|---|---|---|
| 2,478,563 A | 8/1949 | Book | |
| 3,478,381 A | 11/1969 | Schultz, Jr. | |
| 3,557,401 A | 1/1971 | Jenkins | |
| 3,570,041 A | 3/1971 | Closa | |
| 3,577,620 A | 5/1971 | Hoffman et al. | |
| 3,639,942 A | 2/1972 | Ostrom | |
| 3,675,269 A | 7/1972 | Closa | |
| 3,744,083 A | 7/1973 | Jenkins | |
| 3,818,541 A | 6/1974 | Daniels | |
| 3,858,271 A | 1/1975 | Howard et al. | |
| 3,861,703 A | 1/1975 | Gould | |
| 3,869,105 A | 3/1975 | Daniels | |
| 3,893,700 A | 7/1975 | Dunmyer | |
| 3,922,754 A | 12/1975 | Andersen | |
| 3,928,888 A | 12/1975 | Lapham | |
| 3,935,613 A | 2/1976 | Kaneko | |
| 3,977,040 A | 8/1976 | Sugasawara | |
| 4,026,570 A | 5/1977 | Feinberg | |
| 4,054,965 A | 10/1977 | Vig et al. | |
| 4,068,342 A | 1/1978 | Carrier | |
| 4,069,543 A | 1/1978 | James | |
| 4,086,680 A | 5/1978 | Kelly | |
| 4,092,031 A | 5/1978 | Greer et al. | |
| 4,102,556 A | 7/1978 | Webb | |
| 4,107,817 A | 8/1978 | Sloan et al. | |
| 4,129,921 A | 12/1978 | Greene | |
| 4,161,803 A | 7/1979 | Propst et al. | |
| 4,196,493 A | 4/1980 | Propst et al. | |
| 4,262,871 A | 4/1981 | Kolk et al. | |
| 4,316,305 A | 2/1982 | Seaford | |
| 4,327,460 A | 5/1982 | Wolff | |
| 4,332,052 A * | 6/1982 | Remington | 16/30 |
| 4,336,629 A * | 6/1982 | Jarvis et al. | 16/35 R |
| 4,339,842 A | 7/1982 | Fontana et al. | |
| RE31,110 E | 12/1982 | Black | |
| 4,402,107 A | 9/1983 | Geisler, Jr. | |
| 4,409,715 A | 10/1983 | Timmer | |
| 4,457,045 A | 7/1984 | Kegg | |
| 4,463,840 A | 8/1984 | Seynhaeve | |
| 4,530,543 A | 7/1985 | Keane | |
| 4,550,808 A | 11/1985 | Folson | |
| 4,554,704 A | 11/1985 | Raffaeli | |
| 4,570,288 A | 2/1986 | Kassai | |
| 4,624,028 A | 11/1986 | Wilkes | |
| 4,669,580 A | 6/1987 | Neville | |
| 4,679,670 A | 7/1987 | Wickman | |
| 4,707,881 A | 11/1987 | Van Hoye | |
| 4,719,663 A | 1/1988 | Termini | |
| 4,719,664 A | 1/1988 | Berfield | |
| 4,731,900 A | 3/1988 | Frobose | |
| 4,731,901 A | 3/1988 | Daniels | |
| 4,735,459 A | 4/1988 | Massonnet | |
| 4,749,159 A | 6/1988 | Hoff | |
| 4,752,986 A | 6/1988 | Rivkin et al. | |
| 4,772,035 A | 9/1988 | Danial | |
| 4,777,697 A | 10/1988 | Berndt | |
| 4,783,880 A | 11/1988 | Chapman et al. | |
| 4,788,741 A | 12/1988 | Hilborn | |
| 4,793,022 A | 12/1988 | Raffaeli | |
| 4,807,328 A | 2/1989 | Hezel | |
| 4,839,938 A | 6/1989 | Coggin et al. | |
| 4,887,824 A | 12/1989 | Zatlin | |
| 4,932,729 A | 6/1990 | Thompson et al. | |
| 4,953,257 A | 9/1990 | Seynhaeve | |
| 5,136,751 A * | 8/1992 | Coyne et al. | 16/29 |
| 5,426,817 A | 6/1995 | Rekuc | |
| 5,634,240 A | 6/1997 | Brokaw | |
| 5,758,752 A | 6/1998 | King et al. | |
| 6,408,482 B1 | 6/2002 | Henriott et al. | |
| 6,450,515 B1 * | 9/2002 | Guth | 280/79.11 |

\* cited by examiner

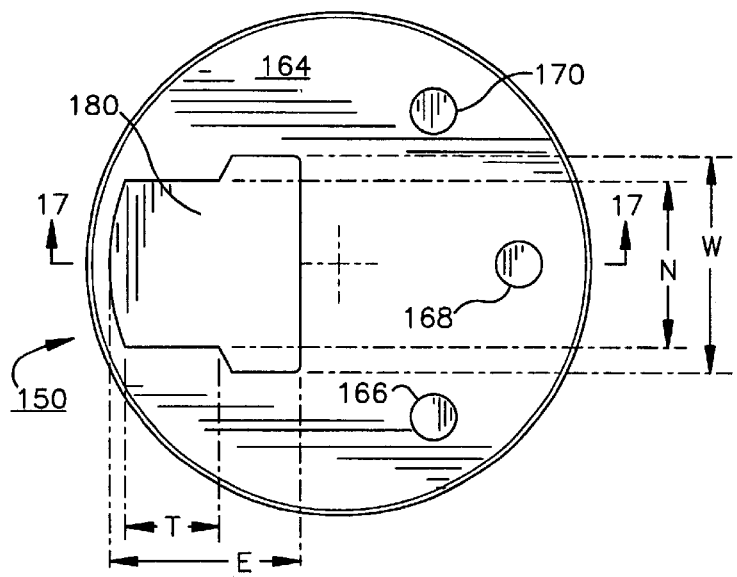
Fig.16
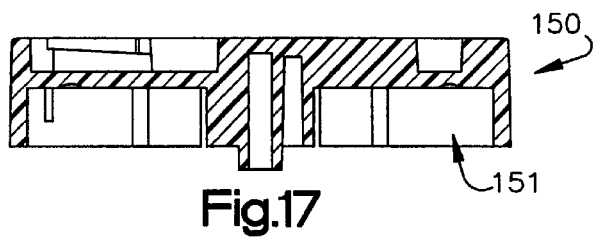
Fig.17
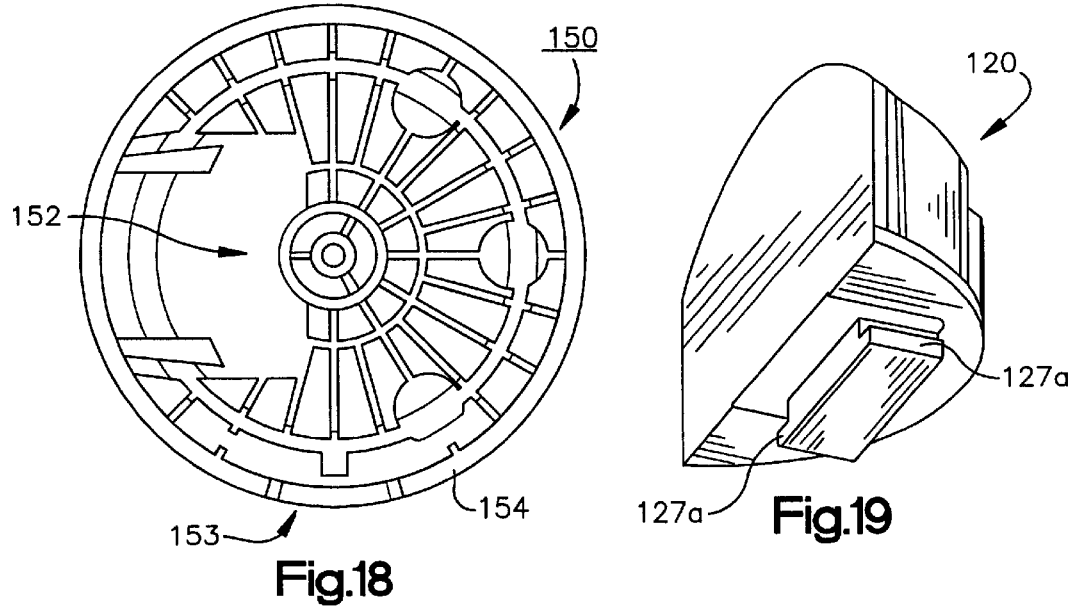
Fig.18
Fig.19

CASTER ASSEMBLY WITH SLIDING SIDE SUPPORT PIECE

FIELD OF THE INVENTION

The present invention is directed to a caster assembly for supporting an object and, more specifically, to a caster assembly including a caster, a caster housing, a mounting support for supporting an object and a pair of side support pieces mounted on the mounting support for providing lateral support to the object, at least one of the side support pieces being slideable for relative movement with respect to the mounting support such that the caster assembly can support objects having differing width.

BACKGROUND ART

Caster assemblies are used to support an object and facilitate easy movement of an object with respect to flat surfaces such as a floor. Examples of objects using caster assemblies include household appliances such as refrigerators, vacuums, food serving trays and carts, tool carts and cabinets, various items of furniture such chairs, sofas, bed frames and the like. Typically, three or more caster assemblies are used to support an object. The caster assemblies are normally positioned or mounted on the object near an outer peripheral edge of the object to provide a wide, stable base of support. A wide base of support reduces the propensity for the object to tip over during movement of the object across a floor. This is especially important for objects having a relatively high vertical center of gravity.

Certain objects to be supported on caster assemblies are characterized by a relatively narrow outer peripheral edge. For supporting such an object it is desirable to include support pieces that would bear against opposite side surfaces of the object for greater stability. What is needed is a caster assembly that provides for side support pieces to bear against opposite side surfaces of an object being supported by the caster assembly for greater stability. What is also needed is a caster assembly that provides for adjustable positioning of at least one of the side support pieces to permit a distance between the side pieces to be adjusted so that objects having different edge widths may be accommodated by the caster assembly.

SUMMARY OF THE INVENTION

The present invention is directed to a caster assembly for supporting an object.

In a first preferred embodiment of the caster assembly of the present invention, the caster assembly includes a caster wheel, a support member rotatably supporting the caster wheel and first and second side support pieces mounted on the support member. The support member includes a base support surface for engaging and supporting a bottom surface of the object to be supported. The first side support piece includes a first side support surface for engaging and supporting a first side surface of the object and the second side support piece includes a second side support surface for engaging and supporting a second side surface of the object, the first and second side support surfaces being transverse to the base support surface. At least one of the first and second side support pieces is slidably mounted on the support member and is adapted to be moved relative to the other side support piece to permit adjustment of a distance between the between the first and second side support surfaces to accommodate objects of different widths.

In a second preferred embodiment of the caster assembly of the present invention, the caster assembly includes a caster wheel, a caster support rotatably supporting the caster wheel, a support housing and first and second side support pieces mounted on the support housing. The support housing is rotatably affixed to the caster support to allow relative rotation between the caster wheel and the first and second side support pieces. The support housing includes a base support surface for engaging and supporting a bottom surface of an object to be supported. The first side support piece includes a first side support surface for engaging and supporting a first side surface of the object and the second side support piece includes a second side support surface for engaging and supporting a second side surface of the object, the first and second side support surfaces being transverse to the base support surface.

At least one of the first and second side support pieces is slidably mounted on the support housing and is adapted to be moved relative to the other side support piece to permit adjustment of a distance between the between the first and second side support surfaces to accommodate objects of different widths. Advantageously, the support housing includes a locking mechanism which may be engaged to prevent relative rotation between the support housing and the caster support.

The present invention also is directed to a method of supporting an object having a bottom surface and spaced apart first and second side walls extending upwardly from the bottom surface using a caster assembly that provides a variable distance between first and second side support surfaces of first and second side support pieces of the caster assembly. In an exemplary embodiment, the first step of the method includes: providing a caster assembly that includes a support member rotatably supporting the caster and first and second side support pieces mounted on the support member, the support member includes a base support surface for engaging and supporting a bottom surface of an object to be supported, the first side support piece includes a first side support surface for engaging and supporting a first side surface of the object and the second side support piece includes a second side support surface for engaging and supporting a second side surface of the object, the first and second side support surfaces being transverse to the base support surface and the second side support piece being slidably mounted on the support member for movement relative to the first side support piece.

The steps of the method further include: sliding the second side support piece such that a distance between the first and second side support surfaces is approximately equal to a distance between the first and second side walls of the object; and moving the caster assembly with respect to the object such that the base support surface engages and supports the bottom surface of the object and the first and second side support surfaces engage and support the first and second side walls of the object.

These and other objects, advantages and features of the invention will become better understood from a detailed description of an exemplary embodiment of the invention which is described in conjunction with the accompanying drawings.

BRIEF DESCRIPTION OF THE DRAWINGS

FIG. 16 is a top plan view of a support housing of the caster assembly of FIG. 13;

FIG. 17 is a section view of the support housing of FIG. 16;

FIG. 18 is a bottom plan view of the support housing of FIG. 16;

FIG. 19 is a perspective view of a sliding side support piece of the caster assembly of FIG. 13;

DETAILED DESCRIPTION OF THE PREFERRED EMBODIMENTS

First Preferred Embodiment of Caster Assembly

Figure 1:
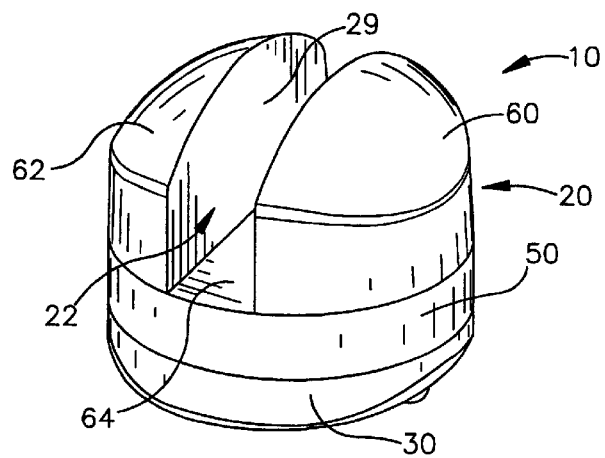
FIG. 1 is a perspective view of a first preferred embodiment of a caster assembly of the present invention.
Figures 3, 4:
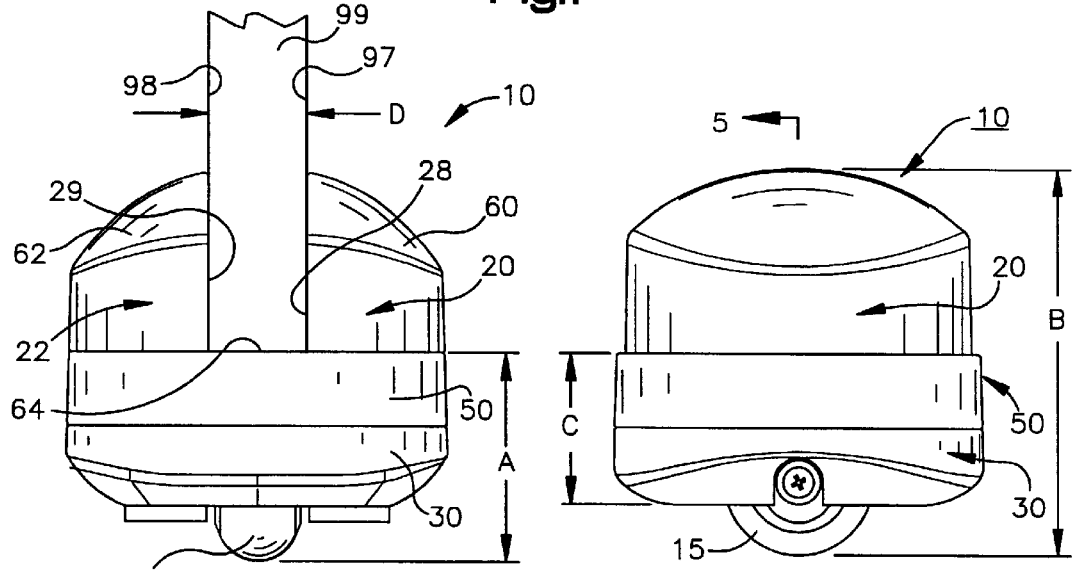
FIG. 3 is a front elevation view of the caster assembly of FIG. 1.
FIG. 4 is a side elevation view of the caster assembly of FIG. 1.
Figure 5:
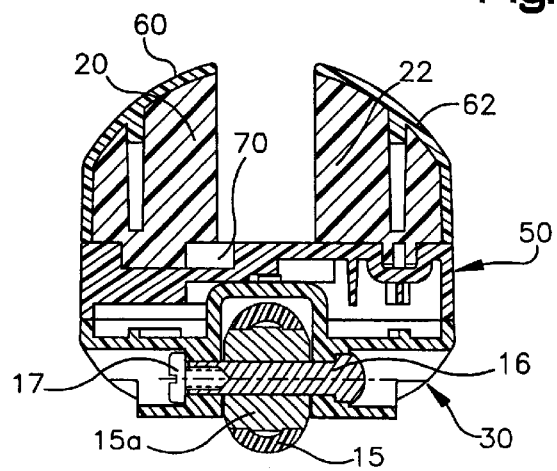
FIG. 5 is a section view of the caster assembly of FIG. 1 as seen from a plane indicated by the line 5—5 in FIG. 4.

Turning to the drawings, FIGS. 1–12 show a first preferred embodiment of a caster assembly of the present invention generally at 10. The caster assembly 10 includes a support member 12, and a caster wheel assembly 14 rotatably supported by the support member 12. The caster assembly 10 further includes first and second side support pieces 20, 22 mounted on the support member 12. The support member 12 includes a lower housing or caster support 30 and an upper or support housing 50 mechanically attached by four #8—32=⅝ inch pan head screws 32, 34, 36, 38 (FIG. 2) which extend between aligned threaded vertical bosses 52, 54, 56, 58 in the support housing 50 and vertical bosses 33, 35, 37, 39 (best seen in FIG. 11) of the caster support 30.

Preferably, the caster support and support housing 30, 50 and the first and second side support pieces 20, 22 are fabricated of an engineering resin material such as urethane rubber or ABS polymer plastic. It should be apparent to others with ordinary skill in the art that alternative suitable materials may be utilized during the practice of this invention.

Figure 2:
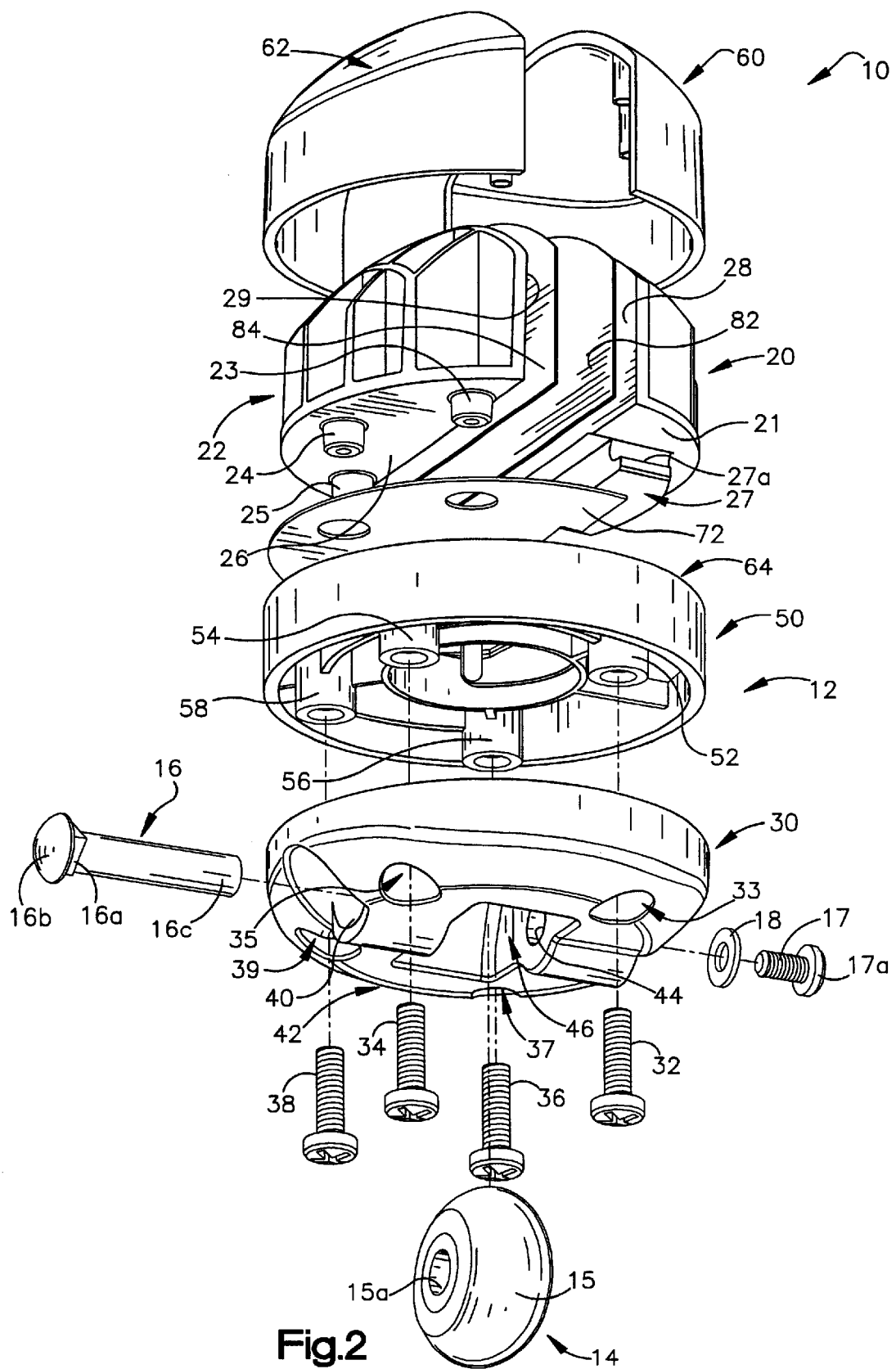
FIG. 2 is an exploded perspective of the caster assembly of FIG. 1.
Figure 6:
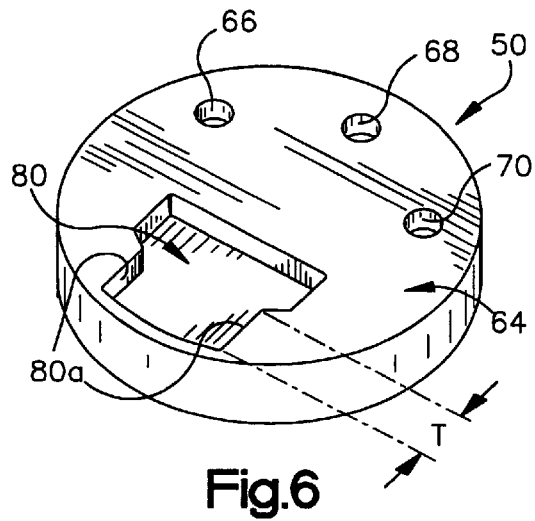
FIG. 6 is a perspective view of a support housing of the caster assembly of FIG. 1.
Figure 7:
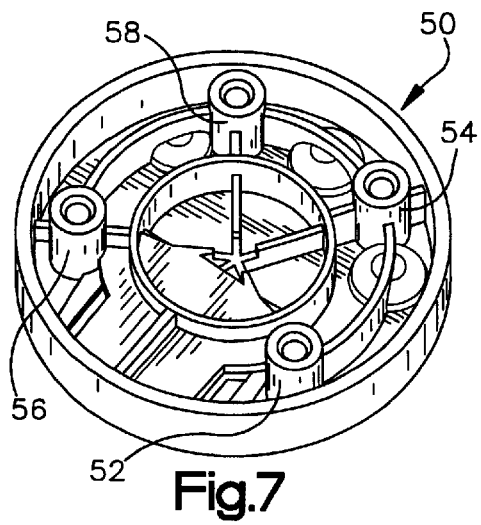
FIG. 7 is a second perspective view of the support housing of FIG. 6.
Figure 8:
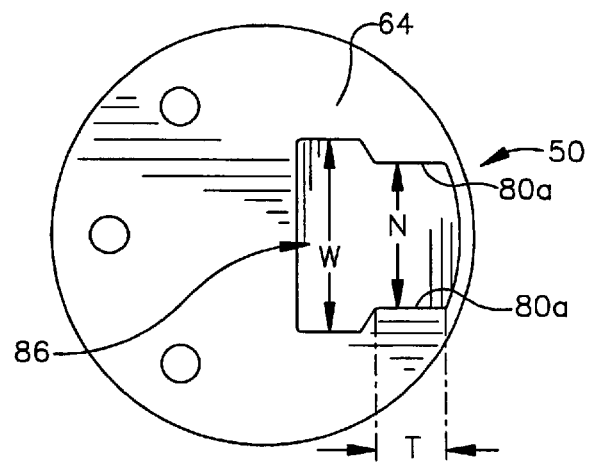
FIG. 8 is a top plan view of the support housing of FIG. 6.
Figure 9:
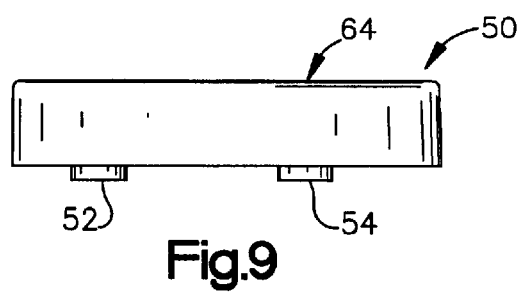
FIG. 9 is a side elevation view of the support housing of FIG. 6.
Figure 10:
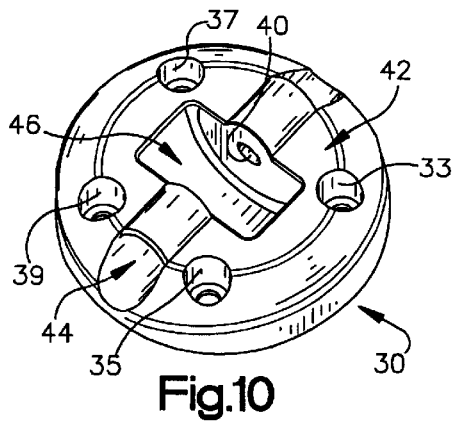
FIG. 10 is a perspective view of a caster support of the caster assembly of FIG. 1.
Figure 11:
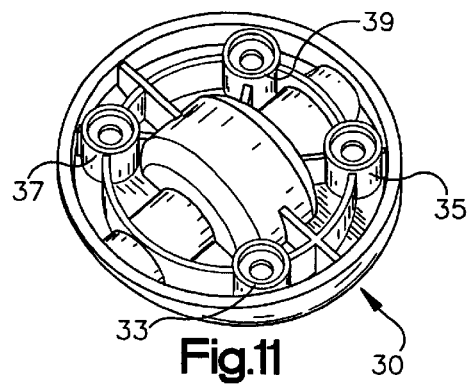
FIG. 11 is a second perspective view of the caster support of FIG. 10.
Figure 12:
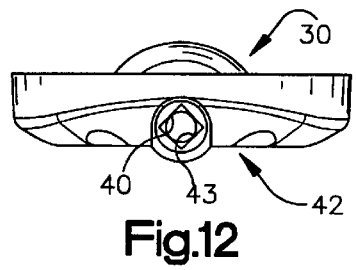
FIG. 12 is a side elevation view of the caster support of FIG. 10.

As can best be seen in FIG. 2, the caster wheel assembly 14 is affixed to the caster support 30. The wheel assembly 14 includes a wheel 15 with a central hub 15a rotatably mounted on a wheel axle 16. Preferably, the wheel 15 is fabricated of urethane, the hub 15a of high impact polypropylene and the wheel axle 16 of steel. The wheel axle 16 is non-rotatably mounted in a first horizontal throughbore 40 formed in a bottom surface portion 42 of the caster support 30. The wheel axle 16 includes a square stem portion 16a adjacent an enlarged head 16b of the axle 16. The square stem portion 16a fits into a square portion 43 (FIG. 12) of the throughbore 40 to prevent rotation of the axle 16 within the throughbore 40.

An extending end portion 16c of the axle 16 extends into a second horizontal throughbore 44 formed in the bottom surface portion 42 of the caster support 30. As can best be seen in FIG. 5, a #8—32×5/16 inch pan head screw 17 threads into a threaded opening in the axle end portion 16c to secure the wheel 15 on the axle 16. A washer 18 is disposed between an enlarged head 17a of the screw 17 and the hub 15a of the wheel 15. A semicircular recess 46 in the bottom surface portion 42 of the caster support 30 provides clearance for the wheel 15.

Plastic covers 60, 62 are affixed to the first and second side support pieces 20, 22 to prevent dust and dirt from entering openings defined by the honeycomb shaped configuration of the first and second side support pieces 20, 22. An upper surface 64 of the support housing 50 supports the first and second side support pieces 20, 22. The second side support piece 22 is stationary with respect to the support housing 50. Cylindrical protrusions 23, 24, 25 extending from a lower surface 26 of the second side piece 22 fit into aligned cylindrical openings 66, 68, 70 (best seen in FIG. 6) in the upper support surface 64 of the support housing 50 to prevent relative horizontal rotation between the second side support piece 22 and the support housing 50. A piece of double sided tape 72 (or, alternatively, a layer of adhesive) (FIG. 2) is sandwiched between the lower surface 26 of the second support piece 22 and the upper surface 64 of the support housing 50 to secure the second side support piece 22 to the upper housing.

Advantageously, the first side support piece 20 is slidable with respect to the support housing 50 thereby permitting a distance D (shown in FIG. 3) between facing side support surfaces 28, 29 of the first and second side support pieces 20, 22 to be adjusted to accommodate a range of objects having different widths. A projection or key 27 extends from a bottom surface 21 of the first side piece 20. The key 27 fits into a wider portion (labeled W in FIG. 8) of an opening 80 in the upper surface 64 of the support housing 50. The key 27 (and, therefore, the first side support piece 20) are slidable along a path of travel labeled T in FIGS. 6 and 8. Parallel stepped edges 27a of the key 27 (only one of which is seen in FIG. 2) slide in parallel slots 80a defining opposing sides of a narrower portion (labeled N in FIG. 8) of the opening 80.

The distance D (FIG. 3) between the side support surfaces 28, 29 of the first and second side support pieces 20, 22 may be varied in an exemplary embodiment of the caster assembly 10 between a minimum distance of about 0.37 inches and a maximum distance of about 0.90 inches. It should be apparent to others with ordinary skill in the art that other travel ranges may be utilized during the practice of this invention.

Pieces of double sided tape 82, 84 are applied to side support surfaces 28, 29 to secure the side support surfaces 28, 29 to respective sides 97, 98 of an object 99 to be supported by the caster assembly 10. Alternatively, a layer of adhesive may be used. It should also be understood that the first side support piece 20 may be removed if desired to support an object that has a width greater than the maximum distance D provided by the caster assembly 10. That is, the first side support piece 20 may be removed and the caster assembly 10 used without the first horizontally sliding side piece 20.

Typical dimensions for one exemplary embodiment of the caster assembly 10, as labeled in the drawings are as follows:

| Label | Figure | Dimension |
| --- | --- | --- |
| A | 3 | 1.563 inches |
| B | 4 | 2.954 inches |
| C | 4 | 1.170 inches |
| D | 3 | 0.37 inch minimum–0.90 inch maximum |
| W | 8 | 1.226 inches |
| N | 8 | 0.948 inch |

Second Preferred Embodiment of Caster Assembly

Turning again to the drawings, FIGS. 13–24 show a second preferred embodiment of a caster assembly of the present invention generally at 100.

Figure 13:
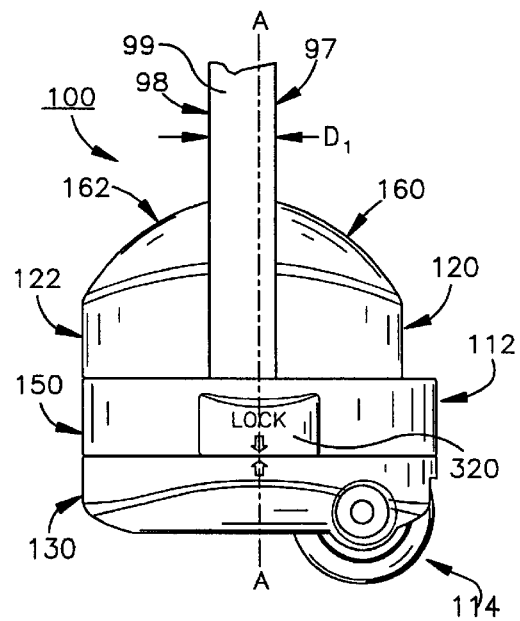
FIG. 13 is a front elevation view of a second preferred embodiment of a caster assembly of the present invention.

As illustrated in FIG. 13, the caster assembly 100 is similar in many respects to the caster assembly 10 disclosed in the first embodiment, but includes an additional feature of relative rotation between a lower housing or caster support 130 and an upper or support housing 150, that is, rotation with respect to axis A—A as labeled in FIG. 13. The caster assembly 100 includes a support member 112, and a caster wheel assembly 114 rotatably supported by the support member 112. The caster assembly 100 further includes first and second side support pieces 120, 122 mounted on the support housing 150 of the support member 112.

Figure 15:
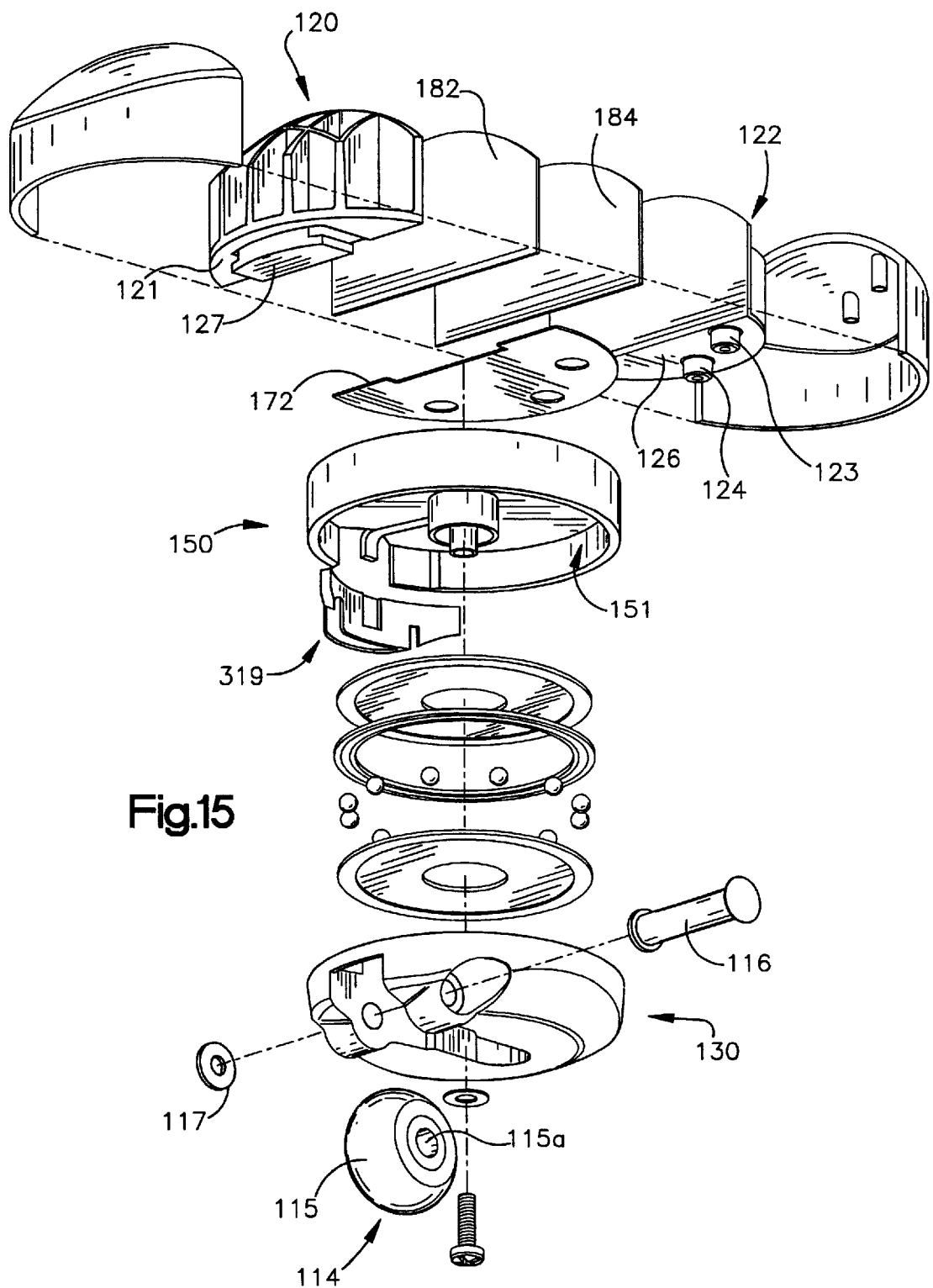
FIG. 15 is an exploded perspective view of the caster assembly of FIG. 13.
Figure 20:
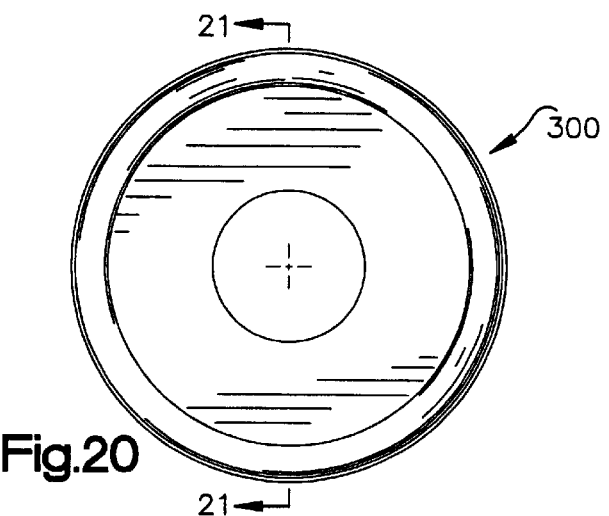
FIG. 20 is a top plan view of a bearing assembly of the caster assembly of FIG. 13.
Figure 21:
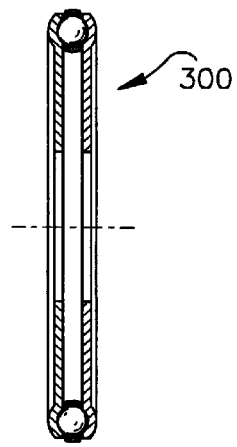
FIG. 21 is a sectional view of the ball bearing assembly of FIG. 20 as seen from a plane indicated by the line 21—21 in FIG. 20.
Figure 22:
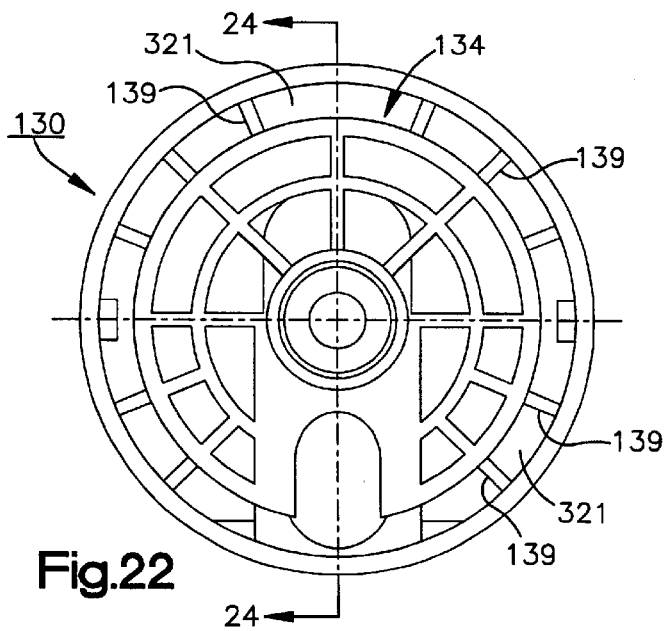
FIG. 22 is a top plan view of a caster support of the caster assembly of FIG. 13.
Figure 24:
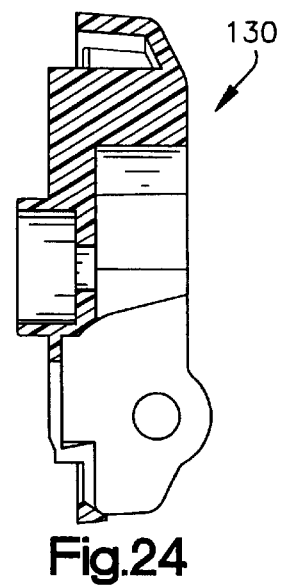
FIG. 24 is a sectional view of the caster support of FIG. 22 as seen from a plane indicated by the line 24—24 in FIG. 22.
Figure 23:
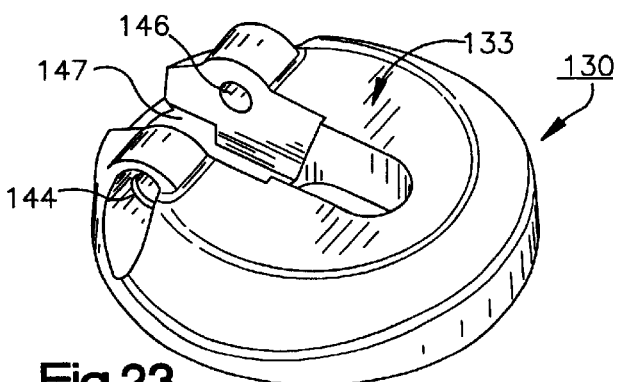
FIG. 23 is a perspective view of the caster support of FIG. 22.
Figure 25:
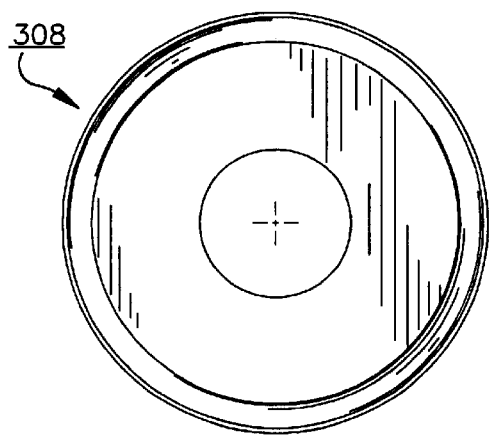
FIG. 25 is a top plan view of a ball bearing race of the ball bearing assembly of FIG. 20.
Figure 26:
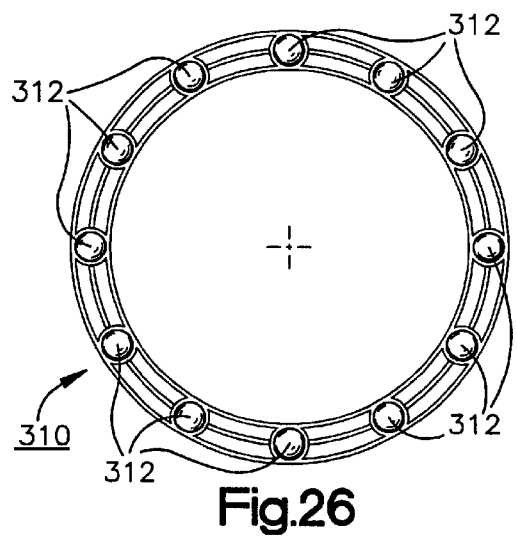
FIG. 26 is a top plan view of a ball bearing cage of the ball bearing assembly of FIG. 20.

The support housing 150 is rotatably affixed to the caster support 130 and rotates about a ball bearing assembly 300. The ball bearing assembly is shown in FIGS. 15, 20 and 21. The ball bearing assembly 300 is disposed within a cavity 151 defined in a lower or bottom side 152 of the support housing 150.

The ball bearing assembly 300, in one exemplary embodiment, is disposed between the caster support 130 and the support housing 150 to provide rotational support between the caster support and the support housing. As is best seen in FIGS. 20 and 21, the ball bearing assembly 300 includes a ball bearing race 308, a bearing cage 310 and a plurality of ball bearings 312. In the illustrated embodiment, each ball bearing 312 is equidistantly disposed around an annular path within the ball bearing cage 312.

A locking mechanism 319 selectively permits or inhibits relative rotation between the support housing 150 and the caster support 130. The locking mechanism 319 includes a locking button 320 affixed to the support housing 150. The lock button 320 extends into an interior region of the support housing 150 through an opening 153 defined in a side wall 154 of the support housing 150 and can slide vertically along a short path of travel. To lock the support housing 150 with respect to the caster support 130, the locking button 320 is pushed downwardly and fits into a selected one of a select number of arcuate recesses 321 defined in the upper surface 134 of the caster support 130 thus locking the support housing 150 and the caster support 130 together. The openings 321 are defined by eight vertically extending ribs 139. When the locking button 320 is pushed upwardly and is disengaged from the selected recess 321, the support housing 150 is free to rotate with respect to caster support 130.

Selectively permitting relative rotation between the caster support 130 and the support housing 150 advantageously facilitates a user of the caster assembly 100 positioning the first and second side support pieces 120, 122 in a desired orientation to support a fixed, heavy or awkward to move object. To properly orient the first and second side support pieces 120, 122, the user may easily rotate the caster support 130 to a desired position. Subsequently, the use may lock the support housing 150 with respect to the caster support 130.

As can best be seen in FIGS. 13, 15 and 15, the caster wheel assembly 114 is affixed to the caster support 130. The wheel assembly 114 includes a tire 115 with a central hub 115a rotatably mounted on a wheel axle rivet 116. The wheel axle 116 is non-rotatably mounted in a first horizontal throughbore 144 (FIG. 23) formed in a bottom surface portion 133 of the caster support 130.

An extending end portion of the axle 116 extends into a second horizontal throughbore 146 formed in the bottom surface portion 133 of the caster support 130. As can best be seen in FIG. 15, a washer 117 is connected to the distal end of the axle 116 to make a suitable connection to secure the wheel hub 115a on the axle 116. A recess 147 in the bottom surface portion 133 of the caster support 130 provides clearance for the wheel 115.

Plastic covers 160, 162 are affixed to the first and second side support pieces 120, 122 to prevent dust and dirt from entering openings defined by the honeycomb shaped configuration of the first and second side support pieces 120, 122. An upper surface 164 of the support housing 150 supports the first and second side support pieces 120, 122. The second side piece 122 is stationary with respect to the support housing 150. Three cylindrical protrusions 123, 124, two of which can be seen in FIG. 16, extending from a lower surface 126 of the second side piece 122 fit into aligned cylindrical openings 166, 168, 170 (best seen in FIG. 16) in the upper surface 164 of the support housing 150 to prevent relative horizontal rotation between the second side support piece 122 and the support housing 150. A piece of double sided tape 172 (or, alternatively, a layer of adhesive) (FIG. 15) is sandwiched between the lower surface 126 of the second side support piece 122 and the upper surface 164 of the support housing 150 to secure the second side support piece 122 to the support housing 150.

Figure 14:
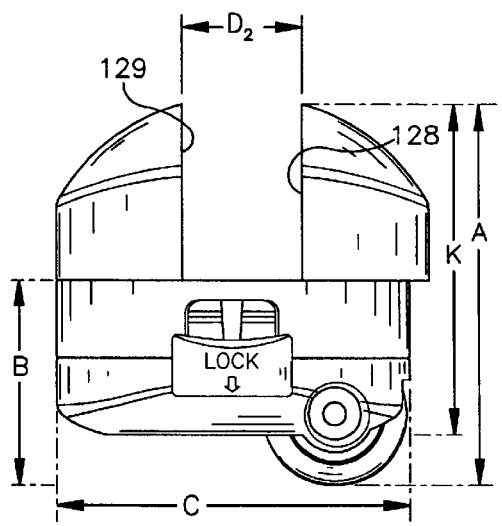
FIG. 14 is a front elevation view of the caster assembly of FIG. 13, showing the sliding side supports of the caster assembly in an alternative position.

As in the first embodiment, the first side support piece 120 is slidable with respect to the support housing 150 thereby permitting a distance between $D_2$, shown in FIG. 14, and $D_1$ shown in FIG. 13, between facing side support surfaces 128, 129 of the first and second side support pieces 120, 122 to be adjusted to accommodate an object 99 having one of a range of different widths. A projection or key 127 (similar in configuration to the key 27 in the first embodiment of the caster assembly 10 described above) extends from a bottom surface 121 of the first side support piece 120. The key 127 fits into a wider portion (labeled W in FIG. 16) of an opening 180 in the upper surface 164 of the support housing 150. The key 127 (and, therefore, the first side support piece 120) are slidable along a path of travel labeled T in FIG. 16. Parallel stepped edges 127a of the key 127 (similar in configuration to the parallel stepped edges 27a of the key 27 of the first embodiment) slide in parallel slots (not shown) defining opposing sides of a narrower portion (labeled N in FIG. 16) of the opening 180.

The distance $D_1$, $D_2$ between the side support surfaces 128, 129 of the first and second side support pieces 120, 122 may be varied in an exemplary embodiment of the caster assembly 100 between a minimum distance of about 0.37 inches and a maximum distance of about 0.90 inches. It should be apparent to others with ordinary skill in the art that other travel ranges may be utilized during the practice of this invention.

Pieces of double sided tape 182, 184 are applied to side support surfaces 128, 129 to secure the side support surfaces 128, 129 to respective sides 97, 98 of an object 99 (FIG. 13) to be supported by the caster assembly 100. Alternatively, a layer of adhesive may be used. It should also be understood that, as was true of the first embodiment, the first side support piece 120 may be removed if desired to support an object that has a width greater than the maximum distance $D_2$ provided by the caster assembly 100. That is, the first side support piece 120 may be removed and the caster assembly 100 used without the first horizontally sliding side support piece 120.

Typical dimensions for one exemplary embodiment of the caster assembly 100, as labeled in the drawings are as follows:

| Label | Figure | Dimension |
| --- | --- | --- |
| A | 14 | 2.675 inches |
| B | 14 | 1.563 inches |
| C | 14 | 2.770 inches |
| W | 16 | 1.221 inches |
| K | 14 | 2.562 inch |

While the present invention has been described with a degree of particularity, it is the intent that the invention include all modifications and alterations from the disclosed embodiments falling within the spirit or scope of the appended claims.

What is claimed is:

1. A caster assembly for supporting an object, the caster assembly comprising:
   a) a caster wheel;
   b) a support member rotatably supporting the caster wheel, the support member including a base support surface for engaging and supporting a bottom surface of object;
   c) a first side support piece and a second side support piece mounted on the support member, the first side support piece defining a first side support surface adapted to engage and support a portion of a first side wall of the object and the second side support piece defining a second side support surface adapted to engage and support a portion of a second side wall of the object, the first and second side support surfaces being transverse to the base support surface; and
   d) the second side support piece being slidably mounted on the support member such that the second side support surface is movable with respect to the first side support surface;
   e) wherein the second side support piece includes a T-shaped projection adapted to slide within a slot formed in an upper surface of the support member.

2. The caster assembly of claim 1 wherein the first and second side support surfaces are parallel to each other and perpendicular to the base support surface.

3. The caster assembly of claim 1 wherein the base support surface and the first and second side support surfaces include a layer of adhesive adapted to engage and affix the caster assembly to the object.

4. The caster assembly of claim 1 wherein an axis of rotation of the caster wheel is parallel to a plane defined by the base support surface and perpendicular to a plane defined by the first side support surface and perpendicular to a plane defined by the second side support surface.

5. The caster assembly of claim 1 wherein the caster wheel is mounted on a caster axle and the support member includes a caster support for supporting the caster axle for relative rotation between the caster wheel and the caster support.

6. The caster assembly of claim 5 wherein the support member further includes a support housing affixed to the caster support, the first and second side support pieces being mounted on the support housing and an upper surface of the support housing defining the base support surface.

7. The caster assembly of claim 6 wherein the support housing is rotatably affixed to the caster support and the support housing rotates with respect to the caster support along an axis of rotation that is perpendicular to an axis of rotation of the caster wheel.

8. The caster assembly of claim 7 wherein the support housing and the caster support are rotatably coupled to a ball bearing assembly.

9. The caster assembly of claim 7 wherein the support housing further includes a locking mechanism that selectively engages the caster support to inhibit rotational movement of the caster support with respect to the support housing.

10. The caster assembly of claim 1 wherein a distance between the first and second side support surfaces is adjusted by sliding the second side support piece with respect to the support member to conform to a distance between the first and second side walls of the object.

11. A caster assembly for supporting an object, the caster assembly comprising:
   a) a caster wheel;
   b) a caster support rotatably supporting the caster wheel;
   c) a support housing rotatably affixed to the caster support and including a base support surface for engaging and supporting a bottom surface of an object to be supported; and
   d) first and second side support pieces mounted on the support housing, the first side support piece including a first side support surface adapted to engage and support a first side surface of the object and the second side support piece including a second side support surface adapted to engage and support a second side surface of the object, the first and second side support surfaces being transverse to the base support surface;
   e) wherein at least one of the first and second side support pieces is slidably mounted on the support housing and is adapted to be moved relative to the other side support piece such that the at least one of the first and second side support pieces that is slidably mounted is movable with respect to the other of the first and second side support pieces;

f) wherein the second side support piece includes a T-shaped projection adapted to slide within a slot formed in an upper surface of the caster support.

12. The caster assembly of claim 11 wherein the first and second side support surfaces are parallel and perpendicular to the base support surface.

13. The caster assembly of claim 11 wherein the base support surface and the first and second side support surfaces include a layer of adhesive adapted to engage and affix the caster assembly to the object.

14. The caster assembly of claim 11 wherein an axis of rotation of the caster wheel is parallel to a plane defined by the base support surface and perpendicular to a plane defined by the first side support surface and perpendicular to a plane defined by the second side support surface.

15. The caster assembly of claim 11 wherein the caster wheel is mounted on a caster axle and the caster support supports the caster axle.

16. The caster assembly of claim 11 wherein an upper surface of the support housing defining the base support surface.

17. The caster assembly of claim 11 wherein the support housing rotates with respect to the caster support along an axis of rotation that is perpendicular to an axis of rotation of the caster wheel.

18. The caster assembly of claim 11 wherein a distance between the first and second side support surfaces is adjusted by sliding the at least one of the first and second side support pieces that is slidably mounted with respect to the caster support to conform to a distance between the first and second side surfaces of the object.

19. The caster assembly of claim 11 wherein the support housing and the caster support are rotatably coupled to a ball bearing assembly.

20. The caster assembly of claim 11 wherein the support housing further includes a locking mechanism that selectively engages the caster support to inhibit sliding movement of the caster support with respect to the support housing.

* * * * *